United States Patent
Robb

(10) Patent No.: US 8,048,579 B2
(45) Date of Patent: Nov. 1, 2011

(54) SHUTDOWN OPERATIONS FOR A SEALED ANODE FUEL CELL SYSTEM

(75) Inventor: Gary M. Robb, Honeoye Falls, NY (US)

(73) Assignee: GM Global Technology Operations LLC, Detroit, MI (US)

(*) Notice: Subject to any disclaimer, the term of this patent is extended or adjusted under 35 U.S.C. 154(b) by 828 days.

(21) Appl. No.: 12/103,953

(22) Filed: Apr. 16, 2008

(65) Prior Publication Data

US 2009/0263696 A1 Oct. 22, 2009

(51) Int. Cl.
*H01M 8/04* (2006.01)
*H01M 8/22* (2006.01)
*H01M 8/24* (2006.01)

(52) U.S. Cl. ........ 429/429; 429/432; 429/444; 429/452; 429/505

(58) Field of Classification Search .......... 429/429, 429/432, 413, 422, 446, 504, 431, 514, 444, 429/505, 452
See application file for complete search history.

(56) References Cited

U.S. PATENT DOCUMENTS

| 5,045,414 A * | 9/1991 | Bushnell et al. ............. 429/432 |
| 2005/0142399 A1* | 6/2005 | Kulp et al. ...................... 429/13 |
| 2006/0188765 A1* | 8/2006 | Matsuzaki et al. ............. 429/23 |
| 2007/0037025 A1* | 2/2007 | Venkataraman et al. ....... 429/22 |

OTHER PUBLICATIONS

"Dummy Load", Reach Information 2008, p. 1-2, retrieved online on Apr. 3, 2011 from: http://www.reachinformation.com/define/Dummy_load.aspx.*

* cited by examiner

*Primary Examiner* — Jonathan Crepeau
*Assistant Examiner* — Kenneth Douyette
(74) *Attorney, Agent, or Firm* — Dinsmore & Shohl LLP

(57) ABSTRACT

Processes to shut down a fuel cell system are described. In one implementation (400), fuel ($H_2$) and oxidizer (air) flow is halted and the system's anode region (305) is sealed. A load (215) is then engaged across the system's fuel cell stack (205) so as to deplete much of the fuel in the stack's sealed anode region (305). The stack (205) is monitored to determine when the load should be disengaged. (215). Once the load is disengaged, fluid communication between the system's anode and cathode regions is established. The vacuum created in the anode region (305) as a consequence of consuming $H_2$ therein, pulls nitrogen enriched gas from the cathode region (310) into the anode region (305). When substantially all of the $H_2$ has been depleted from the anode region (305), no pressure difference exists between the anode and cathode regions and fluid communication between the two is severed.

11 Claims, 3 Drawing Sheets

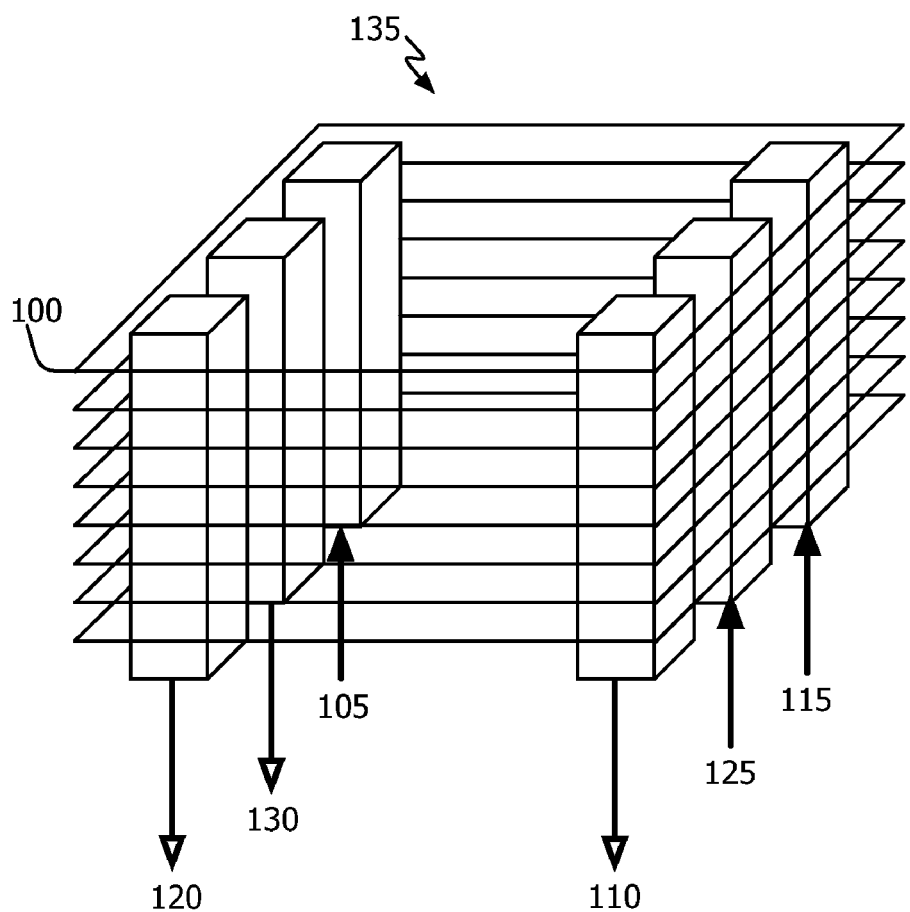
FIG. 1B
(PriorArt)

SHUTDOWN OPERATIONS FOR A SEALED ANODE FUEL CELL SYSTEM

FIELD OF THE INVENTION

The present invention relates a system and method for operating a fuel cell system and, more particularly, to a system and method for controlling fuel cell system shut-down operations.

BACKGROUND

Fuel cells are electrochemical devices that convert chemical energy in fuels into electrical energy directly. In a typical operating cell, fuel is fed continuously to the anode (the negative electrode) and an oxidant is fed continuously to the cathode (positive electrode). Electrochemical reactions take place at the electrodes (i.e., the anode and cathode) to produce an ionic current through an electrolyte separating the electrodes, while driving a complementary electric current through a load to perform work (e.g., drive an electric motor or power a light). Though fuel cells could, in principle, utilize any number of fuels and oxidants, most fuel cells under development today use gaseous hydrogen as the anode reactant (aka, fuel) and gaseous oxygen, in the form of air, as the cathode reactant (aka, oxidant).

To obtain the necessary voltage and current needed for an application, individual fuel cells may be electrically coupled to form a "stack," where the stack acts as a single element that delivers power to a load. The phrase "balance of plant" refers to those components that provide feedstream supply and conditioning, thermal management, electric power conditioning and other ancillary and interface functions. Together, fuel cell stacks and the balance of plant make up a fuel cell system.

Referring to FIG. 1A, fuel cell 100 (shown in a top-down view) is configured to include anode inlet 105, anode outlet 110, cathode inlet 115, cathode outlet 120, coolant inlet 125 and coolant outlet 130. Referring to FIG. 1B, as noted above fuel cells (e.g., fuel cell 100) may be stacked to create fuel cell stack 135, wherein each cell's anode, cathode and coolant passages are aligned.

One operational issue unique to fuel cell systems concerns system start-up and shut-down operations. Unlike internal combustion power plants, fuel cell electrodes may be damaged if exposed to improper gases and/or gas mixtures. For example, an anode's exposure to air can be very damaging to the cell if not done properly. Similarly, shut-down operations that generate mixtures of gasses (e.g., hydrogen-air solutions) may detrimentally affect the fuel cell system during subsequent start-up operations.

SUMMARY

In general, the invention provides a method to shutdown a fuel cell system. A method in accordance with one embodiment includes halting the flow of fuel ($H_2$) and oxidant (air) to the system's fuel cell stack after which the stack's anode region is sealed. A load is then engaged across the stack so as to deplete much of the fuel at the anodes and substantially all of the oxygen at the cathodes of the stack's fuel cells. Once the fuel cells are substantially depleted of fuel, a fluid communication between the stack's anode and cathode regions is opened. Because the stack's anode region is sealed, consumption of fuel therein creates a vacuum. This vacuum will pull $N_2$ enriched gas from the cathode region into the anode region. This action will also pull additional air (oxidant) into the cathode region. To minimize the introduction of $O_2$ enriched gas (air) into the anode region, it has been found beneficial to permit gas into the anode from the cathode at a region distal from where air is permitted to flow into the cathode region. When substantially all of the $H_2$ has been consumed in the anode region, fluid communication between the anode and cathode regions of fuel cell system is terminated.

In one embodiment, voltage across some or all of the stack's fuel cells may be monitored during discharge operations (i.e., when the load is engaged) to determine when to disengage the load. Any fuel cell operational parameter that indicates the state of discharge may be used. For example, cell voltage (absolute and/or rate of change) and current (absolute and/or rate of change) may be used.

Methods in accordance with the invention may be performed by a programmable control device, or control unit, executing instructions organized into one or more program modules. Programmable control devices comprise dedicated hardware control devices as well as general purpose processing systems. Instructions for implementing any method in accordance with the invention may be tangibly embodied in any suitable storage device.

DETAILED DESCRIPTION

The following description is presented to enable any person skilled in the art to make and use the invention as claimed and is provided in the context of the particular examples discussed below, variations of which will be readily apparent to those skilled in the art. More specifically, illustrative embodiments of the invention are described in terms of fuel cells that use gaseous hydrogen ($H_2$) as a fuel, gaseous oxygen ($O_2$) as an oxidant in the form of air (a mixture of $O_2$ and nitrogen, $N_2$) and proton exchange or polymer electrolyte membrane ("PEM") electrode assemblies. The claims appended hereto, however, are not intended to be limited by the disclosed embodiments, but are to be accorded their widest scope consistent with the principles and features disclosed herein.

In general, shutdown operations in accordance with the invention use an external load and an anode-cathode cross-over valve in a sealed anode fuel cell system to consume residual fuel and controllably introduce oxygen depleted air into the anode following the termination of fuel and oxidant gas flow. As used herein, the term "sealed" means that the designated element (e.g., anode) is segregated from ambient in such a manner as it may pull a vacuum (or partial vacuum). One of ordinary skill in the art will recognize that even in a sealed anode (cathode) system, anode (cathode) pressure may become ambient over time after shutdown.

Figure 1A:
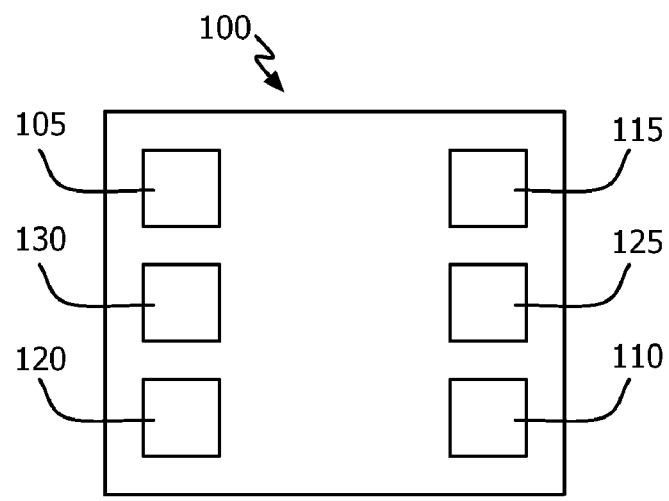
FIG. 1 shows the layout of a single fuel cell (1A) and fuel cell stack (1B) in accordance with conventional prior art fuel cell technology.
Figure 2:
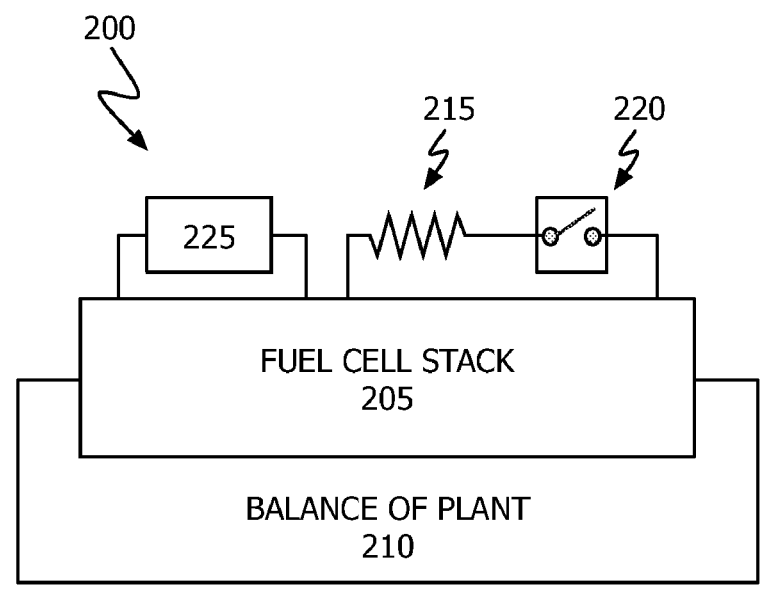
FIG. 2 shows a fuel cell system in accordance with one embodiment of the invention.

Referring to FIG. 2, in one embodiment of the invention fuel cell system 200 includes fuel cell stack 205, balance of plant 210, load 215, switch 220 and cross-over valve 225. Fuel cell stack 205 includes a plurality of fuel cells, aligned so that their anodes and cathodes are coincident as illustrated in FIG. 1B. Balance of plant 210 includes, inter alia, isolation valves, sensors for measuring operating characteristics of some or all of the fuel cells and a control unit for directing the operation of fuel cell system 200 in accordance with the invention. Illustrative fuel cell operating characteristics include, but are not limited to, voltage and current. Load 215 and switch 220 are provided to controllably deplete fuel from the fuel cells' anodes. Cross-over valve 225 is provided to controllably introduce oxygen-depleted gas from the fuel cells' cathode volume into the fuel cells' anode region (see discussion below).

Figure 3:
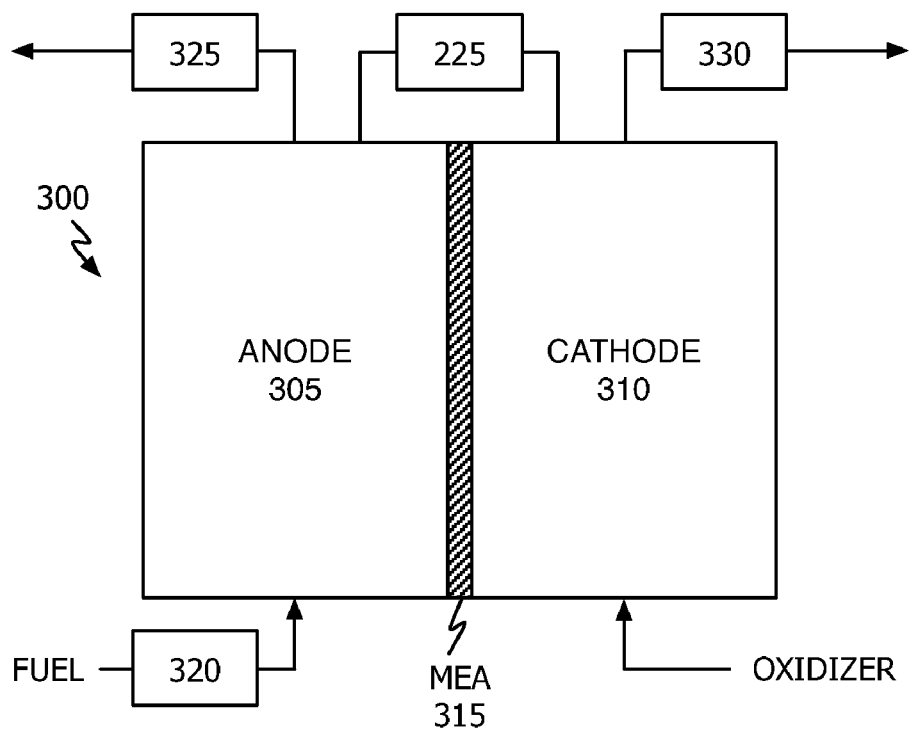
FIG. 3 shows, in schematic form, a fuel cell configuration in accordance with one embodiment of the invention.

Referring to FIG. 3, illustrative fuel cell 300 (from fuel cell stack 205) includes anode region 305 and cathode region 310 separated by membrane electrode assemblies ("MEAs" 315. Associated with fuel cell 300 (and each cell in fuel cell stack 210) are fuel inlet isolation valve 320, fuel outlet isolation valve 325, cathode outlet check valve 330 and cross-over valve 225. Isolation valves 320 and 325 permit fuel ($H_2$ gas) to flow through anode region 305. These valves may also be used to substantially seal anode region 305. Cathode check valve 330 prevents oxidizer ($O_2$ gas/air) from flowing back into cathode region 310. As will be discussed in detail below, cross-over valve 225 provides a mechanism to draw $N_2$ enriched ($O_2$ depleted) gas into anode region 305 during fuel cell system shutdown operations in accordance with the invention.

In the following description, reference will be made to the components of FIG. 3 in which a single fuel cell is illustrated. It will be recognized, however, that each cell in fuel cell stack 205 share common anode and cathode regions or volumes. It will further be recognized that anode isolation valves 320 and 325 and cathode check valve 330 are configured to provide isolation and backflow prevention for all cells in fuel cell stack 205. Finally, cross-over valve 225 allows fluid communication between the anode and cathode regions of all cells in fuel cell stack 205.

Figure 4:
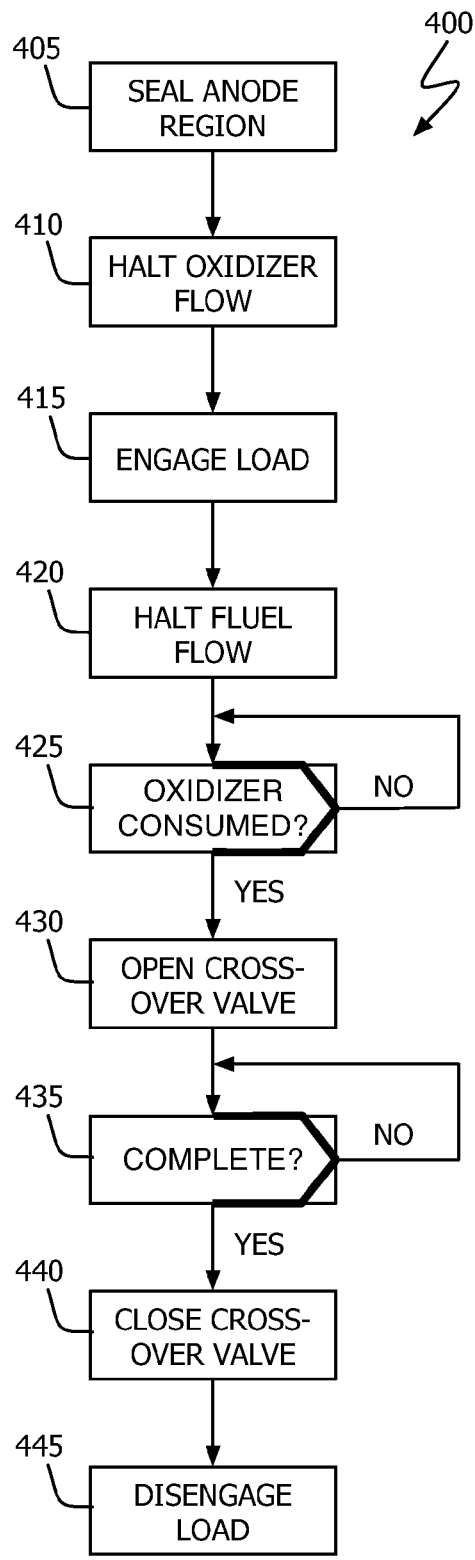
FIG. 4 shows, in flow chart format, a shutdown operation in accordance with one embodiment of the invention.

Referring to FIG. 4, in one embodiment of the invention shutdown operation 400 begins by using isolation valves 320 and 325 to seal anode region 305 (block 405). Next, oxidizer flow to cathode region 310 is halted (block 410), switch 220 is used to engage load 215 (block 415) and fuel flow is halted (block 420). The general purpose of engaging load 215 is to provide a complete electrical circuit so that all/most of the $H_2$ (fuel) present at the anode and all/most of the oxygen present at the cathode is consumed. When all or most of the oxidizer has been consumed at the cathode (the "Yes" prong of block 425), cross-over valve 225 is opened (block 430). As illustrated, cross-over valve 225 remains closed until all/most of the $O_2$ (oxidant) present at the cathode is consumed (the "No" prong of block 425). Because anode region 305 is isolated via valves 320 and 325, as $H_2$ is consumed the pressure in anode region 305 falls with respect to cathode region 310 (which is at ambient) causing a vacuum to form in anode region 305. In practice, it has been found beneficial to keep the pressure difference between anode region 305 and cathode region 310 to less than a pre-determined value. The precise value will, of course, depend on the selected composition and construction of fuel cell stack 205.

Sensors (see discussion above) are used to monitor the activity of each, most or some fuel cells in fuel cell stack 205—i.e., fuel cell 300. These sensors may be used in accordance with the invention to determine when most of the $H_2$ (fuel) present at, and in, the stack's anodes (or oxygen present at, or in, stack's cathodes) has been consumed. For those implementations which monitor fuel cell voltages, while the measured voltages remain above a specified first threshold (the "No" prong of block 435), load 215 remains engaged and cross-over valve 225 remains open to permit continued $H_2$ and $O_2$ consumption. When the measured voltages drop to a specified first threshold (the "Yes" prong of block 435), cross-over valve 225 is closed (block 440) and switch 220 is used to disengage load 215 (block 445). In one embodiment, the specified first threshold is between approximately 0 and 200 millivolts ("mv")—the lower limit being selected to prevent carbon corrosion of the cells' electrodes, the upper limit being selected to ensure that the majority of the $H_2$ ($O_2$) present at, and in, the anodes' (cathodes') side of the electrode is consumed. While illustrative lower and upper limits have been provided, one of ordinary skill in the art will recognize that other phenomenon may affect the threshold voltage used in any specific implementation. It will further be recognized that using materials currently available, it is desirable to maintain fuel cell voltages above zero to minimize carbon corrosion of the fuel cells' electrodes. As different materials become available, this consideration may become less significant. As a result, fuel cell voltages may be allowed to drop closer to zero or even go "negative" before determining that it is time to disengage the load in accordance with block 445.

In another embodiment, it is the overall stack voltage which is measured and used to determine when to terminate $H_2/O_2$ consumption. In yet another embodiment, it is the rate of voltage decrease across a cell(s) that is used as a threshold. In still another embodiment, the current produced by each cell or combination of cells is monitored and used to select a first threshold. In another embodiment, it is the rate of current production decrease that is monitored. While only voltages and currents have been described here, it will be recognized that virtually any measurable operational characteristic of a fuel cell may be monitored and used in accordance with the acts of block 435.

When cross-over valve 225 is opened in accordance with the acts of block 430, $N_2$ enriched ($O_2$ depleted) air from cathode region 310 is drawn into anode region 305 because of the anode region's vacuum. This, in turn, causes air to be pulled into cathode region 310. To ensure that substantially only $N_2$ enriched gas is drawn into anode region 305, it has been found beneficial to place cross-over valve 225 in a position distal from the cathode region's air intake. Referring again to FIG. 3, it will be noted that oxidizer (air) inlet is on a first side of cathode region 310 and cross-over valve 225 and check valve 330 are on another side. In this arrangement, air drawn into cathode region 310 passes over the cathode region's side of MEA 315. As the air does this, its $O_2$ will tend to be consumed thereby providing additional $N_2$ enriched gas for anode region 305.

Once cross-over valve 225 has been shut in accordance with block 440, the "active" shutdown process is complete. It will be recognized, however, that over time the state of the fuel cell stack may change. For example, because cathode region 310 is not sealed air will diffuse into it over time (in one implementation this took approximately 5-6 hours). Over additional time (in one implementation this took approximately another 6-12 hours), air will pass through MEA 315 and enter anode region 305. Because anode region 305 and cathode region 310 initially contain enriched $N_2$ gas (following the acts of block 440), the introduction of air at this rate over this, or similar, time periods does not tend to harm MEA 315. In addition, shutdown operations in accordance with the invention significantly reduce the likelihood that $H_2/O_2$ mixtures form in the fuel cell system.

Various changes in the materials, components, circuit elements, as well as in the details of the illustrated operational method are possible without departing from the scope of the following claims. For instance, the illustrative system of FIG.

2 is not limited to hydrogen fueled, air oxidized fuel cell systems. Further, switch 220 may be of any type practical (e.g., electromechanical or electronic), anode region 305 may be sealed in any manner desired, check valve 330 may be implemented in any way that effectively prevents air from flowing into a region close to cross-over valve 225's connection to cathode region 310 and fluid communication between anode region 305 and cathode region 310 may be provided by a valve or other mechanism appropriate for a fuel cell system. In addition, load 215 may be used to deplete the cells' fuel in any desired manner. For example, load 215 may be constantly engaged until a first threshold is met. Alternatively, load 215 may be engaged in a periodic or cyclic manner. Load 215 may be a fixed or variable resistance. If the latter is used, the value of the load would typically be adjusted during the time the load is engaged to deplete most of the anode region's fuel. These approaches are described more fully in commonly owned patent application entitled "Shutdown Operations for an Unsealed Cathode Fuel Cell System," Ser. No. 12/103,939 and which is hereby incorporated by reference.

Additionally, acts in accordance with FIG. 4 may be performed by a programmable control device (aka "control unit") executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A fuel cell system shutdown method, the fuel cell system having a fuel cell stack comprised of a plurality of fuel cells, the fuel cells arranged to form an anode region and a cathode region, the method comprising:
    sealing the anode region;
    halting oxidizer flow to the cathode region;
    engaging a load across the fuel cell stack;
    halting fuel flow to the anode region;
    opening a fluid communication between the anode region and the cathode region; and
    disengaging the load and closing the fluid communication between the anode region and the cathode region when a fuel cell operational characteristic meets a first threshold.

2. The method of claim 1, wherein the fuel comprises gaseous hydrogen and the oxidizer comprises gaseous oxygen.

3. The method of claim 1, wherein the load comprises a fixed resistance.

4. The method of claim 1, wherein the operational characteristic comprises a voltage across one or more of the fuel cells and the first threshold comprises a specified voltage.

5. The method of claim 4, wherein the specified voltage comprises a voltage that is greater than, or equal to, zero.

6. The method of claim 4, wherein the specified voltage comprises a voltage that is greater than or equal to 0 and less than an upper voltage limit.

7. The method of claim 6, wherein the upper voltage limit is approximately 250 millivolts.

8. A program storage device, readable by a programmable control device, comprising instructions stored thereon for causing the programmable control device to perform the method of claim 1.

9. A fuel cell system shutdown operation, the fuel cell system having a plurality of fuel cells, each fuel cell having an anode region and a cathode region, comprising:
    sealing the anode region so as to permit a vacuum to form therein;
    halting gaseous air flow to the fuel cells;
    engaging a resistive load across the plurality of fuel cells to consume most of the $H_2$ in the anode region;
    halting gaseous hydrogen ($H_2$) flow to the fuel cells;
    opening a fluid passageway between the anode region and the cathode region;
    monitoring a voltage across one or more of the fuel cells;
    disengaging the resistive load and closing the fluid passageway between the anode region and the cathode region when the monitored voltage across one or more of the fuel cells meets a first threshold.

10. The method of claim 9, wherein the first threshold comprises a voltage between approximately 0 millivolts and 200 millivolts.

11. The method of claim 9, wherein the fluid passageway comprises a valve.

* * * * *